United States Patent
Chuang et al.

(10) Patent No.: US 9,448,604 B2
(45) Date of Patent: Sep. 20, 2016

(54) POWERED DEVICE

(71) Applicant: HON HAI PRECISION INDUSTRY CO., LTD., New Taipei (TW)

(72) Inventors: Mao-Chang Chuang, New Taipei (TW); Yung-Chiang Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 362 days.

(21) Appl. No.: 14/222,787

(22) Filed: Mar. 24, 2014

(65) Prior Publication Data
US 2015/0108962 A1  Apr. 23, 2015

(30) Foreign Application Priority Data
Oct. 22, 2013 (TW) .................. 102138008

(51) Int. Cl.
*G06F 1/26* (2006.01)
*H04L 12/10* (2006.01)

(52) U.S. Cl.
CPC .............. *G06F 1/266* (2013.01); *G06F 1/26* (2013.01); *H04L 12/10* (2013.01)

(58) Field of Classification Search
CPC .......... G06F 1/26; G06F 1/263; G06F 1/266; H02H 11/006; H02H 11/007; H04L 12/10
See application file for complete search history.

(56) References Cited

U.S. PATENT DOCUMENTS

| | | | | |
|---|---|---|---|---|
| 7,778,409 B2* | 8/2010 | Karam | .................... | H04L 12/10 379/403 |
| 2009/0228722 A1* | 9/2009 | Lin | ......................... | H04L 12/10 713/300 |
| 2014/0129850 A1* | 5/2014 | Paul | ........................ | H04L 12/10 713/300 |

FOREIGN PATENT DOCUMENTS

| | | |
|---|---|---|
| CN | 101436786 B | 2/2011 |
| CN | 202749806 U | 2/2013 |
| CN | 103259325 A | 8/2013 |

\* cited by examiner

*Primary Examiner* — Dennis M Butler
(74) *Attorney, Agent, or Firm* — Zhigang Ma

(57) ABSTRACT

A powered device is electronically connected to power sourcing equipment (PSE), to receive voltage signals from the PSE. The powered device comprises a rectifier unit, a recognition unit, a control unit, a converter and a powered circuit. The recognition unit identifies that the PSE is an Ethernet PSE or a DC PSE. The control unit controls whether the control unit output a negative voltage signal output by the rectifier unit, according to a positive voltage signal output by the rectifier unit and a identified result output by the recognition unit. The converter converts the negative voltage signal and the positive voltage signal to a working voltage of the powered circuit, to drive the powered circuit. To feed power by a single interface and identify that the PSE is the Ethernet PSE or the DC PSE, according to a simple circuit architecture.

18 Claims, 3 Drawing Sheets

POWERED DEVICE

FIELD

The disclosure relates to power management, and particularly power management to supply power for a powered device.

BACKGROUND

A power over Ethernet (POE) describes any of several standardized or ad-hoc systems which pass electrical power along with data on Ethernet cabling. This allows a single cable to provide both data connection and electrical power to devices. Unlike standards such as an universal serial bus (USB) which also power devices over the data cables, the POE allows long cable lengths. In addition to standardizing existing practice for spare-pair and common-mode data pair power transmission, the POE standards provide signaling between an Ethernet power sourcing equipment (PSE) and a powered device (PD).

It is unnecessary for a PD to obtain power from an adapter, depending on the PD that is connected to the Ethernet PSE. However, at this moment a direct current (DC) PSE is necessary in response the PD is read as abnormal. The PD is connected to the Ethernet PSE or the DC PSE through different interfaces, because the function of a power circuit connected to the Ethernet PSE of the PD is different from the function of a power circuit connected to the DC PSE of the PD. The power circuit connected to the Ethernet PSE and the power circuit connected to the DC PSE also must be connected to different interfaces. Therefore, a single interface of the PD fed power is needed.

BRIEF DESCRIPTION OF THE DRAWINGS

Many aspects of the present embodiments can be better understood with reference to the appended drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
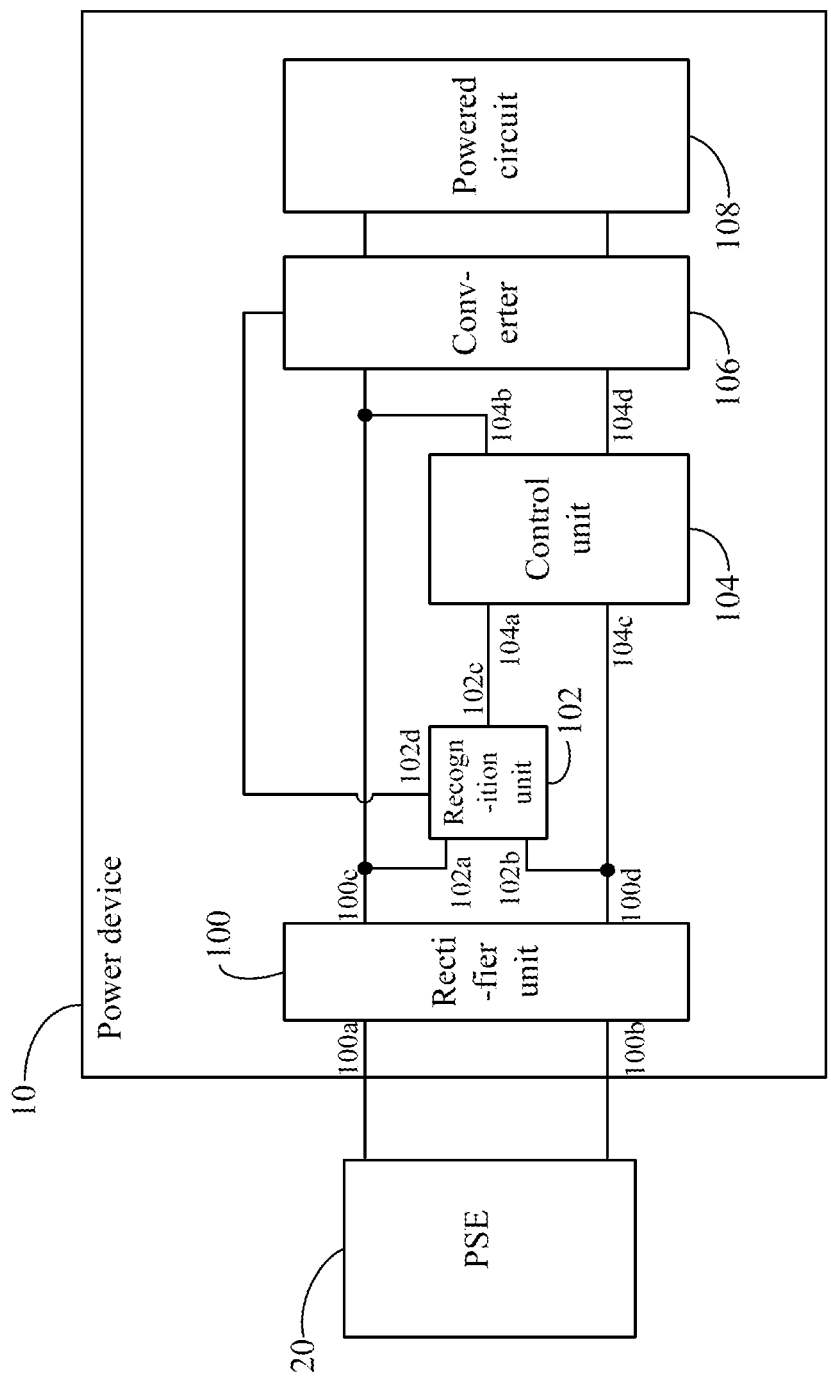
FIG. 1 is a function module and application environment diagram of one embodiment of a powered device.

FIG. 1 is a function module and application environment diagram of one embodiment of a powered device (PD) 10. In at least one embodiment, the PD 10 is electronically connected to a power sourcing equipment (PSE) 20, to receive voltage signals. In at least one embodiment, the voltage signals comprises a first voltage signal and a second voltage signal, the polarity of the first voltage signal being opposite with the second voltage signal, the PSE 20 can be a Ethernet PSE or a direct current (DC) PSE. In at least one embodiment, the output voltage of the Ethernet PSE is between 40v and 48v, the output voltage of the DC PSE is between 10v and 16v.

In one embodiment, in response to the PSE 20 can be an Ethernet PSE, the PD 10 is applied in a power over Ethernet (POE), the POE comprises the PD 10 and the Ethernet PSE. The Ethernet PSE supplies power for clients of the POE, and is a manager of the POE. The PD 10 is a loader which is powered by the Ethernet PSE, and is a client of the POE, such as internet protocol (IP) phones, IP cameras, wireless access points, mobile phones, and laptops. After power supply conduction, different PDs have different resistance, and generate different characteristic impedance. The Ethernet PSE outputs power signal to the PD 10 through Ethernet according to device type, connectivity, and power consumption level of information of the PD 10.

In one embodiment, the Ethernet PSE comprises a first output and a second output with an opposite polarity to the first output. The Ethernet PSE detects characteristic impedance of the PD 10, and outputs power signal to the PD 10 according to the detected characteristic impedance of the Ethernet PSE. The PSE 40 stores a corresponding relationship of the characteristic impedance and operating voltage. The PSE 40 selects the operating voltage to supply power for the PD 10, according to the characteristic impedance of the PD 10. In this example, in response to the Ethernet PSE being connected to the PD 10, the PSE 40 detects the characteristic impedance of the PD 10, to class the PD 10, to supply corresponding operating voltage for the PD 10. In response to the Ethernet PSE being disconnected to the PD 10, the PSE 40 stops supplying power for the PD 10 quickly, and duplicates the detection of the Ethernet PSE being connected to the PD 10.

In one embodiment, the PD 10 comprises a rectifier unit 100, a recognition unit 102, a control unit 104, a converter 106, and a powered circuit 108.

The rectifier unit 100 can comprise a first receiving terminal 100a, a second receiving terminal 100b, a positive output 100c, and a negative output 100d. The first receiving terminal 100a and the second receiving terminal 100b of the rectifier unit 100 are electronically connected to the PSE 20, to receive the voltage signals from the PSE 20, to output a positive voltage signal from the positive output 100c of the rectifier unit 100 and a negative voltage signal from the negative output 100d of the rectifier unit 100 according to rectifying by the rectifier unit 100. In at least one embodiment, the rectifier unit 100 is a full bridge rectifier circuit constituted by four diodes.

The recognition unit 102 comprises a first input 102a, a second input 102b, a first output 102c, and an auxiliary power output 102d. The first input 102a and the second input 102b of the recognition unit 102 are electronically connected to the positive output 100c and the negative output 100d of the rectifier unit 100 respectively, to identify that the PSE 20 is the Ethernet PSE or the DC PSE and output a recognition voltage signal to the control unit 104. When the PSE 20 is the DC PSE, the auxiliary power output 102d of the recognition unit 102 outputs an auxiliary power signal to the converter 106, and the first output 102c of the recognition unit 102 outputs a first recognition voltage signal to the control unit 104. When the PSE 20 is the Ethernet PSE, the auxiliary power output 102d of the recognition unit 102 does not output an auxiliary power signal to the converter 106, and the first output 102c of the recognition unit 102 outputs a second recognition voltage signal to the control unit 104.

The control unit 104 comprises a first input 104a, a second input 104b, a third input 104c, and an output 104d. The control unit 104 stores a first threshold, a second threshold, a third threshold, and a fourth threshold. The second input 104b and the third input 104c of the control unit 104 are electronically connected to the positive output 100c and the negative output 100d of the rectifier unit 100 respectively, the first input 104a is electronically connected to the first output 102c of the recognition unit 102. The control unit 104 controls whether the third input 104c connects to the output 104d and confirms whether the negative output 100d of the rectifier unit 100 outputs the negative voltage signal to the converter 106, according to the control unit 104 compares a voltage of the positive voltage signal with the first threshold and the second threshold respectively and compares a voltage of the recognition voltage signal with the third threshold and the fourth threshold respectively.

In at least one embodiment, the first threshold is the same as a minimum voltage of the Ethernet PSE, the second threshold is the same as a minimum voltage of the DC PSE.

The converter 106 comprises a first input, a second input, a auxiliary power input, and an output. The first input and the second input of the converter 106 are electronically connected to the positive output 100c of the rectifier unit 100 and the output 104d of the control unit 104 respectively, the auxiliary power input is electronically connected to the auxiliary power output 102d of the recognition unit 102, the output of the converter 106 is electronically connected to the powered circuit 108. When the PSE 20 is the Ethernet PSE, the converter 106 converts the positive voltage signal output by the rectifier unit 100 and the negative voltage signal output by the control unit 104 to an appropriate voltage for the powered circuit 108, to drive the powered circuit 108. When the PSE 20 is the DC PSE, the recognition unit 102 outputs the auxiliary power signal to the converter 106, to drive the converter 106, and the converter 106 converts the positive voltage signal output by the rectifier unit 100 and the negative voltage signal output by the control unit 104 to the appropriate voltage for the powered circuit 108, to drive the powered circuit 108. In at least one embodiment, the converter 106 is a Direct Current/Direct Current (DC/DC) converter.

In at least one embodiment, when the PSE 20 is the Ethernet PSE, the voltage of the recognition voltage signal is smaller than the fourth threshold (0.4v), and the voltage of the positive voltage signal output by the control unit 104 is greater than the first threshold (40v). Therefore, the recognition unit 102 does not output the auxiliary power signal to the converter 106, and the control unit 104 controls that the third output 104c of the control unit 104 connects to the output 104d. The rectifier unit 100 outputs the positive voltage signal and the negative voltage signal to the converter 106. When the PSE 20 is the Ethernet PSE, there is no need to provide an auxiliary power signal to drive the converter 106, the converter 106 converts the positive voltage signal and the negative voltage signal to the appropriate voltage for the powered circuit 108, to drive the powered circuit 108.

In at least one embodiment, when the PSE 20 is the DC PSE, the recognition unit 102 delays a predetermined time to avoid startup error, the voltage of the recognition voltage signal is greater than the third threshold (2.5v), and the voltage of the positive voltage signal output by the control unit 104 is greater than the first threshold (10v). Therefore, the recognition unit 102 outputs the auxiliary power signal to the converter 106, and the control unit 104 controls that the third output 104c of the control unit 104 connects to the output 104d. The rectifier unit 100 outputs the positive voltage signal and the negative voltage signal to the converter 106, and the recognition unit 102 outputs the auxiliary power signal to drive the converter 106, the converter 106 converts the positive voltage signal and the negative voltage signal to the appropriate voltage for the powered circuit 108. To feed power by a single interface and identify that the PSE 20 is the DC PSE or the Ethernet PSE, according to a simple circuit architecture.

Figure 2:
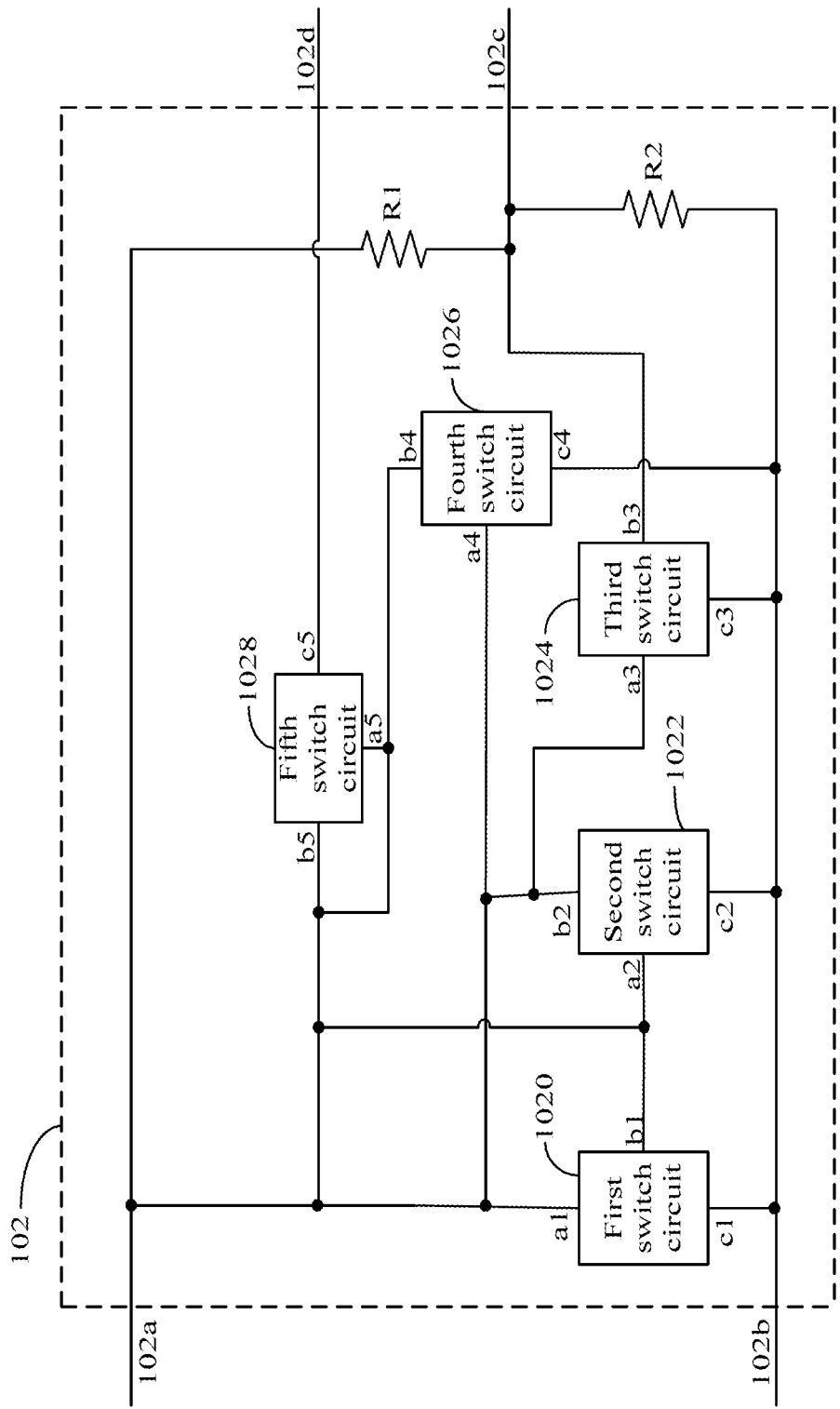
FIG. 2 is a circuit diagram of one embodiment of a recognition unit of the powered device of FIG. 1.

FIG. 2 is a circuit diagram of one embodiment of the recognition unit 102 of the powered device 10 of FIG. 1. In at least one embodiment, the recognition unit 102 of the PD 10 comprises a first switch circuit 1020, a second switch circuit 1022, a third switch circuit 1024, a fourth switch circuit 1026, a fifth switch circuit 1028, a first resistor R1, and a second resistor R2. Each of the first to fifth switch circuit 1020-1028 comprises control terminals a1-a5, first terminals b1-b5, and second terminals c1-c5. The second terminals c1-c4 of the first to fourth switch circuit 1020-1026 are electronically connected to the second output 102b of the recognition unit 102, the control terminal a1 and the first post b1 of the first switch circuit 1020 are electronically connected to the first input 102a of the recognition unit 102. The control terminal a2 of the second switch circuit 1022 is electronically connected to a node between the first post b1 of the first switch circuit 1020 and the first input 102a of the recognition unit 102, the first terminal b2 of the second switch circuit 1022 is electronically connected to the first input 102a of the recognition unit 102. The control terminal a3 of the third switch circuit 1024 is electronically connected to a node between the first terminal b2 of the second switch circuit 1022 and the first input 102a of the recognition unit 102, the first terminal b3 of the third switch circuit 1024 is electronically connected to the output 102c of the recognition unit 102. The control terminal a4 of the fourth switch circuit 1026 is electronically connected to a node between the first terminal b2 of the second switch circuit 1022 and the first input 102a of the recognition unit 102, the first terminal b4 of the fourth switch circuit 1026 is electronically connected to the first input 102a of the recognition unit 102. The control terminal a5 and the first terminal b5 of the fifth switch circuit 1028 are electronically connected to a node between the first terminal b4 of the fourth switch circuit 1026 and the first input 102a of the recognition unit 102, the second terminal c5 is electronically connected to the auxiliary power output 102d of the recognition unit 102.

The first resistor R1 is electronically connected between the first input 102a and the output 102c of the recognition unit 102. A first end of the second resistor R2 is electronically connected to the second input 102b of the recognition unit 102, the second end of the second resistor R2 is electronically connected to a node between the first resistor R1 and the output 102c of the recognition unit 102.

In at least one embodiment, when the PSE 20 is the DC PSE, the control terminal a1 of the first switch circuit 1020 controls the channel between the first terminal b1 and the second terminal c1 to not be conducted, the control terminal a2 of the second switch circuit 1022 controls the channel between the first terminal b2 and the second terminal c2 to be conducted, the control terminal a3 of the third switch circuit 1024 controls the channel between the first terminal b3 and the second terminal c3 to not be conducted, the control terminal a4 of the fourth switch circuit 1026 controls the channel between the first terminal b4 and the second terminal c4 to not be conducted. The control terminal a5 of the fifth switch circuit 1028 controls the channel between the first terminal b5 and the second terminal c5 to not be conducted. The recognition unit 102 outputs an auxiliary power signal to the converter 106, and a first voltage of the output 102c of the recognition unit 102 is equal to a voltage of the second end of the second resistor R2.

When the PSE 20 is the Ethernet PSE, the control terminal a1 of the first switch circuit 1020 controls the channel between the first terminal b1 and the second terminal c1 to be conducted, the control terminal a2 of the second switch circuit 1022 controls the channel between the first terminal b2 and the second terminal c2 to not be conducted, the control terminal a3 of the third switch circuit 1024 controls the channel between the first terminal b3 and the second terminal c3 to be conducted, the control terminal a4 of the fourth switch circuit 1026 controls the channel between the first terminal b4 and the second terminal c4 to be conducted. The control terminal a5 of the fifth switch circuit 1028 controls the channel between the first terminal b5 and the second terminal c5 to not be conducted. The recognition unit 102 does not output an auxiliary power signal to the converter 106, and a second voltage of the output 102c of the recognition unit 102 is equal to a voltage between the first terminal b3 and the second terminal c3 of the third switch circuit 1024. In at least one embodiment, the second voltage of the output 102c of the recognition unit 102 is smaller than the first voltage.

Figure 3:
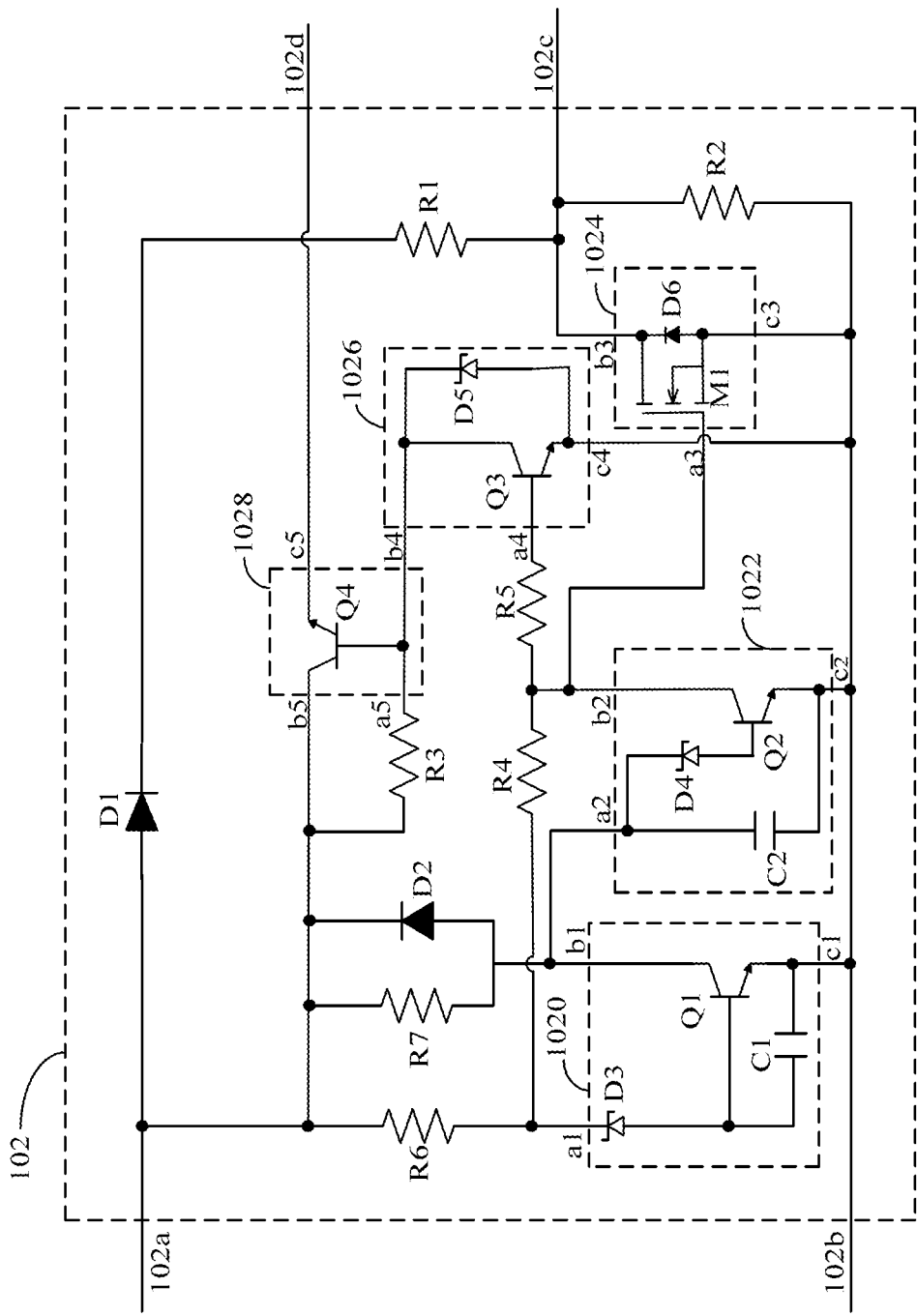
FIG. 3 is a circuit diagram of another embodiment of a recognition unit of the powered device of FIG. 1.

FIG. 3 is a circuit diagram of another embodiment of the recognition unit 102 of the powered device 10 of FIG. 1. In at least one embodiment, the recognition unit 102 of the PD 10 comprises a first to fifth diode D1-D5, a first to seventh resistor R1-R7, a first and second capacitor C1-C2, a first to fourth transistor Q1-Q4, and a metal-oxide semiconductor field effect transistor (MOSFET) M1. In at least one embodiment, the first to fourth transistor Q1-Q4 are NPN transistors, the third to fifth diode D3-D5 are zener diodes, the MOSFET M1 is an n-type MOSFET. An anode of the first diode D1 is electronically connected to the first input 102a, the first resistor R1 is electronically connected between a cathode of the first diode D1 and the output 102c. The second resistor R2 is electronically connected between the second input 102b and the output 102c. A collector of the fourth transistor Q4 is electronically connected to the first input 102a, an emitter of the fourth transistor Q4 is electronically connected to the auxiliary power output 102d, the third resistor R3 is electronically connected between a base and the collector of the fourth transistor Q4.

One end of the sixth resistor R6 is electronically connected to a node between the collector of the fourth transistor Q4 and the first input 102a, the other end of the sixth resistor R6 is electronically connected to a cathode of the third diode D3, the first capacitor C1 is electronically connected between a anode of the third diode D3 and the second input 102b. A cathode of the second diode D2 and one end of the seventh resistor R7 are electronically connected to a node between the collector of the fourth transistor Q4 and the first input 102a, an anode of the second diode D2 is electronically connected to the other end of the seventh resistor R7. A collector of the first transistor Q1 is electronically connected to a node between the anode of the second diode D2 and the seventh resistor R7, a base of the first transistor Q1 is electronically connected to a node between the first capacitor C1 and the anode of the third diode D3, an emitter of the first transistor Q1 is electronically connected to a node between the second input 102b and the second resistor R2. One end of the second capacitor C2 and a cathode of the fourth diode D4 are electronically connected to the collector of the first transistor Q1, an anode of the fourth diode D4 is electronically connected to a base of the second transistor Q2, an emitter of the second transistor Q2 and the other end of the second capacitor C2 are electronically connected to a node between the second input 102b and the second resistor R2.

One end of the fourth resistor R4 is electronically connected to a node of the cathode of the third diode D3 and the second resistor R2, the other end of the fourth resistor R4 is electronically connected to the collector of the second transistor Q2. One end of the fifth resistor R5 is electronically connected to a node between the fourth resistor R4 and the collector of the second transistor Q2, the other end of the fifth resistor R5 is electronically connected to a base of the third transistor Q3, a collector of the third transistor Q3 is electronically connected to a node between the third resistor R3 and the base of the fourth transistor Q4, an emitter of the third transistor Q3 is electronically connected to a node between the second input 102b and the second resistor R2. An anode of the fifth diode D5 is electronically connected to the emitter of the third transistor Q3, a cathode of the fifth diode D5 is electronically connected to the collector of the third transistor Q3. A grid of the MOSFET M1 is electronically connected to a node between the fourth resistor R4 and the collector of the second transistor Q2, a source of the MOSFET M1 is electronically connected to a node between the second input 102b and the second resistor R2, a drain of the MOSFET M1 is electronically connected to a node between the output 102c and the second resistor R2. An anode of the sixth diode D6 is electronically connected to the source of the MOSFET M1, a cathode of the sixth diode D6 is electronically connected to the drain of the MOSFET M1.

The recognition unit 102 of the PD 10 comprises a first switch circuit 1020, a second switch circuit 1022, a third switch circuit 1024, a fourth switch circuit 1026, a fifth switch circuit 1028. The first switch circuit 1020 comprises the first transistor Q1, the first capacitor C1, and the third diode D3. The cathode of the third diode D3, the collector and the emitter of the first transistor Q1 are respectively corresponding to a control terminal a1, a first terminal b1, and a second terminal c1 of the first switch circuit 1020.

The second switch circuit 1022 comprises the second transistor Q2, the second capacitor C2, and the fourth diode D4. The cathode of the fourth diode D4, the collector and the emitter of the second transistor Q2 are respectively corresponding to a control terminal a2, a first terminal b2, and a second terminal c2 of the second switch circuit 1022. The third switch circuit 1024 comprises the MOSFET M1 and the sixth diode D6. The grid, the drain, and the source of the MOSFET M1 are respectively corresponding to a control terminal a3, a first terminal b3, and a second terminal c3 of the third switch circuit 1024.

The fourth switch circuit 1026 comprises the third transistor Q3 and the fifth diode D5. The base, the collector, and the emitter of the third transistor Q3 are respectively corresponding to a control terminal a4, a first terminal b4, and a second terminal c4 of the fourth switch circuit 1026. The fifth switch circuit 1028 comprises the fourth transistor Q4. The base, the collector, and the emitter of the third transistor Q4 are respectively corresponding to a control terminal a5, a first terminal b5, and a second terminal c5 of the fifth switch circuit 1028.

In at least one embodiment, the MOSFET M1 are transistors, the first to fourth transistor Q1-Q4 are MOSFETs. In another embodiment, each of the first to fourth transistor Q1-Q4 is an NPN transistor or a PNP transistor, to adjust the type of the first to fourth transistor Q1-Q4 according to different conduction demand.

In at least one embodiment, when the PSE 20 is the Ethernet PSE, the Ethernet PSE outputs a first voltage signal (48v), the first voltage signal charges for the first capacitor C1 through the sixth resistor R6 and the third diode D3. When voltage of the first capacitor C1 is greater than 0.7v, the channel between the emitter and the collector of the first transistor Q1 is conducted, and the first voltage signal does not flow in the second transistor Q2. The channel between the emitter and the collector of the third transistor Q3 is conducted according to the first voltage signal flow through the first resistor R1, the fourth resistor R4, and the fifth resistor R5. The first voltage signal does not flow in the second transistor Q2, and the first voltage signal flows in the fourth transistor Q4 through the third resistor R3. Therefore, when the PSE 20 is the Ethernet PSE, the recognition unit 102 does not output the auxiliary power signal to the converter 106 through the fourth transistor Q4. The voltage of the output 102c is low level (0.3v), because voltage of the grid of the MOSFET M1 is positive and the source of the MOSFET M1 is negative. The voltage of the output 102c is smaller than 0.4v, the control unit 104 confirms that the PSE 20 is the Ethernet PSE, and the voltage of the second input 104b of the control unit 104 is greater than 40v, the channel between the third input 104c and the output 104d of the control unit 104 is conducted. No need to provide the auxiliary power signal to drive the converter 106, the converter 106 converts the positive voltage signal and the negative voltage signal to the appropriate voltage for the powered circuit 108, to drive the powered circuit 108.

In at least one embodiment, when the PSE 20 is the DC PSE, the DC PSE outputs a second voltage signal (16v). The second voltage signal charges for the second capacitor C2 through the second resistor R2, the time of the second capacitor C2 charged over is 500 ms, the second capacitor C2 is a delayer, the recognition unit 102 delays a predetermined time (500 ms) to avoid startup error. After the predetermined time the channel between the emitter and the collector of the second transistor Q2 is conducted, the second voltage signal does not flow in the third transistor Q3. The second voltage signal flows in the converter 106 through the third resistor R3 and the fourth transistor Q4, to supply the auxiliary power signal for the converter 106. The channel between the grid and the source the MOSFET M1 is not conducted, because the channel between the emitter and the collector of the second transistor Q2 is conducted. Therefore, the voltage of the output 102c is equal to a voltage of the second end of the second resistor R2, the voltage of the second end of the second resistor R2 is greater than 3v, and the voltage of the output 102c is high level (3v). The voltage of the output 102c is greater than 2.5v, the control unit 104 confirms that the PSE 20 is the DC PSE, and the voltage of the second input 104b of the control unit 104 is greater than 10v, the channel between the third input 104c and the output 104d of the control unit 104 is conducted. The converter 106 converts the positive voltage signal and the negative voltage signal to the appropriate voltage for the powered circuit 108, to drive the powered circuit 108. To feed power by a single interface and identify that the PSE 20 is the DC PSE or the Ethernet PSE, according to a simple circuit architecture.

The PD 10 comprises the rectifier unit 100, the recognition unit 102, the control unit 104, the converter 106, and the powered circuit 108. To feed power by a single interface and identify that the PSE 20 is the DC PSE or the Ethernet PSE, according to a simple circuit architecture.

The foregoing description of the various embodiments has been presented for purposes of illustration and explanation. The embodiments are therefore not intended to be exhaustive or to limit the following claims to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A powered device, electronically connected to a power sourcing equipment, the power sourcing equipment outputting voltage signals to the powered device, the powered device comprising:
    a powered circuit;
    a rectifier unit, electronically connected to the power sourcing equipment (PSE), the rectifier unit receiving the voltage signals from the PSE and outputting a positive voltage signal and a negative voltage signal by rectifying the voltage signals;
    a recognition unit, electronically connected to the rectifier unit, the recognition unit identifying whether the PSE is an Ethernet PSE or a direct current (DC) PSE, outputting a recognition voltage signal, and outputting an auxiliary power signal in response to the PSE being the DC PSE;
    a control unit, electronically connected to the rectifier unit and the recognition unit, the control unit controlling whether the rectifier unit outputs the negative voltage signal according to the recognition voltage signal and the positive voltage signal outputted by the rectifier unit; and
    a converter electronically connected to the rectifier unit, the recognition unit, the control unit, and the powered circuit, in response to the PSE being the Ethernet PSE, the converter converting the positive voltage signal outputted by the rectifier unit and the negative voltage signal outputted by the control unit to an appropriate voltage to drive the powered circuit;
    wherein in response to the PSE being the DC PSE, the recognition unit outputs the auxiliary power signal to drive the converter and the converter converts the positive voltage signal outputted by the rectifier unit and the negative voltage signal outputted by the control unit to an appropriate voltage to drive the powered circuit.

2. The powered device of claim 1, wherein the rectifier unit comprises a first receiving terminal, a second receiving terminal, a positive output, and a negative output, the first receiving terminal and the second receiving terminal of the rectifier unit are electronically connected to the PSE.

3. The powered device of claim 2, wherein the recognition unit comprises a first input, a second input, a first output, and an auxiliary power output, the first input and the second input of the recognition unit are electronically connected to the positive output and the negative output of the rectifier unit respectively.

4. The powered device of claim 3, wherein the control unit comprises a first input, a second input, a third input, and an output, the second input and the third input of the control unit are electronically connected to the positive output and the negative output of the rectifier unit respectively, the first input of the control unit is electronically connected to the first output of the recognition unit.

5. The powered device of claim 4, wherein the converter comprises a first input, a second input, an auxiliary power input, and an output, the first input and the second input of the converter are electronically connected to the positive output of the rectifier unit and the output of the control unit respectively, the auxiliary power input is electronically connected to the auxiliary power output of the recognition unit, the output of the converter is electronically connected to the powered circuit.

6. The powered device of claim 4, wherein the control unit stores a first threshold, a second threshold, a third threshold, and a fourth threshold, the control unit controls whether the third input of the control unit connects to the output and confirms whether the negative output of the rectifier unit outputs the negative voltage signal to the converter, according to the control unit compared a voltage of the positive voltage signal with the first threshold and the second threshold respectively and compared a voltage of the recognition voltage signal with the third threshold and the fourth threshold respectively.

7. The powered device of claim 3, wherein the recognition unit further comprises a first switch circuit, a second switch circuit, a third switch circuit, a fourth switch circuit, a fifth switch circuit, each of the first to fifth switch circuit comprising a control terminal, a first terminal, and a second terminal; and wherein:
the second terminals of the first to fourth switch circuit are electronically connected to the second output of the recognition unit;
the control terminal and the first post of the first switch circuit are electronically connected to the first input of the recognition unit;
the control terminal of the second switch circuit is electronically connected to a node between the first post of the first switch circuit and the first input of the recognition unit, the first terminal of the second switch circuit is electronically connected to the first input of the recognition unit;
the control terminal of the third switch circuit is electronically connected to a node between the first terminal of the second switch circuit and the first input of the recognition unit, the first terminal of the third switch circuit is electronically connected to the output of the recognition unit;
the control terminal of the fourth switch circuit is electronically connected to a node between the first terminal of the second switch circuit and the first input of the recognition unit, the first terminal of the fourth switch circuit is electronically connected to the first input of the recognition unit; and
the control terminal and the first terminal of the fifth switch circuit are electronically connected to a node between the first terminal of the fourth switch circuit and the first input of the recognition unit, the second terminal is electronically connected to the auxiliary power output of the recognition unit.

8. The powered device of claim 7, wherein the recognition unit further comprises:
a first resistor, electronically connected between the first input and the output of the recognition unit; and
a second resistor, a first end of the second resistor being electronically connected to the second input of the recognition unit, the second end of the second resistor being electronically connected to a node between the first resistor and the output of the recognition unit.

9. The powered device of claim 8, wherein in response to the PSE being the DC PSE, the control terminal of the first switch circuit controls the channel between the first terminal and the second terminal to not be conducted, the control terminal of the second switch circuit controls the channel between the first terminal and the second terminal to be conducted, the control terminal of the third switch circuit controls that the channel between the first terminal and the second terminal to not be conducted, the control terminal of the fourth switch circuit controls the channel between the first terminal and the second terminal to not be conducted, the control terminal of the fifth switch circuit controls the channel between the first terminal and the second terminal to not be conducted, the recognition unit outputs the auxiliary power signal to the converter, and a first voltage of the output of the recognition unit is equal to a voltage of the second end of the second resistor.

10. The powered device of claim 9, wherein in response to the PSE being the Ethernet PSE, the control terminal of the first switch circuit controls the channel between the first terminal and the second terminal to be conducted, the control terminal of the second switch circuit controls the channel between the first terminal and the second terminal to not be conducted, the control terminal of the third switch circuit controls the channel between the first terminal and the second terminal to be conducted, the control terminal of the fourth switch circuit controls the channel between the first terminal and the second terminal to be conducted, the control terminal of the fifth switch circuit controls the channel between the first terminal and the second terminal to not be conducted, the recognition unit does not output the auxiliary power signal to the converter, and a second voltage of the output of the recognition unit is equal to a voltage between the first terminal and the second terminal of the third switch circuit.

11. The powered device of claim 10, wherein the second voltage is smaller than the first voltage.

12. The powered device of claim 7, wherein the first switch circuit comprises a first transistor, a first capacitor, and a third diode, a collector of the first transistor is electronically connected to the first terminal of the first switch circuit, a base of the first transistor is electronically connected to an anode of the third diode, an emitter of the first transistor is electronically connected to the second terminal of the first switch circuit, a cathode of the third diode is electronically connected to the control terminal of the first switch circuit, the first capacitor is electronically connected between the base and the emitter of the first transistor.

13. The powered device of claim 12, wherein the second switch circuit comprises a second transistor, a second capacitor, and a fourth diode, a base of the second transistor is electronically connected to an anode of the fourth diode, an emitter of the second transistor is electronically connected to the second terminal of the second switch circuit, a collector of the second transistor is electronically connected to the first terminal of the second switch circuit, a cathode of the fourth diode is electronically connected to the control terminal of the second switch circuit, one end of the second capacitor is electronically connected to the cathode of the fourth diode, the other end of the second capacitor is electronically connected to the emitter of the second transistor.

14. The powered device of claim 13, wherein the third switch circuit comprises a metal-oxide semiconductor field effect transistor (MOSFET) and a sixth anode, a grid of the MOSFET is electronically connected to the control terminal of the third switch circuit, a source of the MOSFET is electronically connected to the second terminal of the third switch circuit, a drain of the MOSFET is electronically connected to the first terminal of the third switch circuit, the sixth diode is electronically connected between the source and the drain of the MOSFET.

15. The powered device of claim 14, wherein the fourth switch circuit comprises a third transistor and a fifth diode, the fifth diode is a zener diode, a base of the third transistor is electronically connected to the control terminal of the fourth switch circuit, an emitter of the third transistor is electronically connected to the second terminal of the fourth switch circuit, a collector of the third transistor is electronically connected to the first terminal of the fourth switch circuit, the fifth diode is electronically connected between the emitter and collector of the third transistor.

16. The powered device of claim 15, wherein the fifth switch circuit comprises a fourth transistor, a base, a collector, and an emitter of the third transistor are respectively corresponding to the control terminal, the first terminal, and the second terminal of the fifth switch circuit.

17. The powered device of claim 16, wherein the recognition unit further comprises a first diode, a second diode, a third resistor, a fourth resistor, a fifth resistor, a sixth resistor, a seventh resistor, the first diode is electronically connected between the first resistor and the first input of the recognition unit, an anode of the first diode is electronically connected to the first input of the recognition unit, the second diode is electronically connected between the first terminal of the first switch circuit and the first input of the recognition unit, an anode of the second diode is electronically connected to the first input of the recognition unit, the third resistor is electronically connected between the second terminal of the third switch circuit and the first input of the recognition unit, the fourth resistor is electronically connected between the first terminal of the first switch circuit and the first input of the recognition unit, the fifth resistor is electronically connected between the control terminal of the fifth switch circuit, the sixth resistor is electronically connected between the fifth resistor and the seventh resistor, the seventh resistor is electronically connected between the sixth resistor and the control terminal of the fourth switch circuit.

18. The powered device of claim 1, wherein the recognition unit comprises a delayer, and when the PSE is the DC PSE, the recognition unit delays for a predetermined time.

* * * * *